United States Patent
Sorze

(10) Patent No.: US 9,243,693 B2
(45) Date of Patent: Jan. 26, 2016

(54) SPEED VARIATOR

(75) Inventor: Fabio Sorze, Lendinara (IT)

(73) Assignee: ITALYCAR S.R.L., Lendinara (IT)

( * ) Notice: Subject to any disclaimer, the term of this patent is extended or adjusted under 35 U.S.C. 154(b) by 441 days.

(21) Appl. No.: 13/822,559

(22) PCT Filed: Sep. 21, 2010

(86) PCT No.: PCT/IT2010/000399
§ 371 (c)(1),
(2), (4) Date: Mar. 12, 2013

(87) PCT Pub. No.: WO2012/038991
PCT Pub. Date: Mar. 29, 2012

(65) Prior Publication Data
US 2013/0184122 A1 Jul. 18, 2013

(51) Int. Cl.
*F16H 15/18* (2006.01)
*F16H 15/20* (2006.01)

(52) U.S. Cl.
CPC ............ *F16H 15/18* (2013.01); *F16H 15/20* (2013.01)

(58) Field of Classification Search
CPC .................................. F16H 15/18; F16H 15/20
See application file for complete search history.

(56) References Cited

U.S. PATENT DOCUMENTS

| | | | |
|---|---|---|---|
| 861,069 A | 7/1907 | Wood | |
| 904,868 A | 11/1908 | Hansen | |
| 1,176,550 A * | 3/1916 | Clark et al. | 476/19 |
| 1,246,683 A * | 11/1917 | Tooth | 476/19 |
| 2,461,258 A * | 2/1949 | Brooks | 322/28 |
| 2,583,790 A * | 1/1952 | Mikina | 476/4 |
| 2,642,749 A * | 6/1953 | Wood | 476/48 |
| 3,298,238 A * | 1/1967 | Lea | 74/721 |
| 3,420,114 A * | 1/1969 | Prestl | 476/50 |
| 3,626,453 A * | 12/1971 | Riley | 476/51 |
| 4,183,253 A * | 1/1980 | Borello | 476/16 |
| 4,459,868 A * | 7/1984 | Sargent | 476/4 |
| 4,590,815 A * | 5/1986 | Sargent | 477/37 |
| 5,525,119 A | 6/1996 | Marques | |
| 5,588,933 A * | 12/1996 | Hartman | 476/51 |
| 6,524,214 B1 * | 2/2003 | Cillessen et al. | 476/55 |
| 6,626,780 B2 * | 9/2003 | Fragnito | 474/54 |
| 6,824,496 B2 * | 11/2004 | Mason et al. | 476/51 |
| 6,997,848 B1 * | 2/2006 | Cillessen et al. | 476/55 |
| 7,077,782 B2 * | 7/2006 | Mason et al. | 476/50 |

FOREIGN PATENT DOCUMENTS

| | | |
|---|---|---|
| DE | 156244 | 6/1903 |
| DE | 314836 | 1/1918 |
| DE | 2648808 | 5/1978 |
| GB | 926835 | 5/1963 |
| WO | 02052171 | 7/2002 |

* cited by examiner

*Primary Examiner* — David M Fenstermacher
(74) *Attorney, Agent, or Firm* — Pearne & Gordon LLP

(57) ABSTRACT

A speed variator comprises a bell-shaped body (5) forming a frustoconical rolling surface (6) able to rotate about its own axis of symmetry (Y), a wheel (7) able to rotate about a second axis (W) and engaged by rolling with the rolling surface (6) to allow the transmission of a driving torque between the wheel (7) and the bell-shaped body (5), and an actuator (9) acting between the wheel (7) and the bell-shaped body (5) for moving the wheel (5) and the bell-shaped body (7) towards and/or away from each other in such a way as to make the wheel (7) engage with different portions of the rolling surface (6). The rolling surface (6) and the second axis (W) converge in a point (P).

17 Claims, 16 Drawing Sheets

SPEED VARIATOR

TECHNICAL FIELD

This invention relates to a speed variator, whose configuration provides high performance in the transmission of motion from a motor or engine to a user device.

In particular, the speed variator according to this invention can be applied to the output of any type of motor or engine, whether electric or of the internal combustion type.

BACKGROUND ART

There are prior art speed variators which have a driving wheel that engages, by rolling, on the outer surface of a conical bell-shaped body (driven unit) in such a way that it can slide along the axis of the bell-shaped body to vary the radius of the circumference traveled by the wheel on the bell-shaped body, thus varying the gear ratio. In these variators, the axes of rotation of the bell-shaped body and the wheel are parallel.

Disadvantageously, in conventional variators of the type just described, in the contact area between the wheel and the bell-shaped body, micro-slippages are created which result in a dissipation of power, penalising the overall performance of the reduction stage. Such slippages are mostly caused by a kinematic coupling which is not optimum between the wheel and the bell-shaped body.

Moreover, the local deformability of the wheel and/or the bell-shaped body generates hysteresis cycles which have the effect of dissipating a further fraction of the power transmittable.

DISCLOSURE OF THE INVENTION

In this context, the technical purpose which forms the basis of this invention is to propose a speed variator which overcomes the above-mentioned disadvantages of the prior art.

In particular, this invention has for an aim to provide a speed variator able to produce high overall performance, maximising the power transmitted and therefore minimising power losses.

The technical purpose indicated and the aims specified are substantially achieved by a speed variator with the technical features described in one or more of the appended claims.

BRIEF DESCRIPTION OF THE DRAWINGS

Further features and advantages of this invention are more apparent from the non-limiting description which follows of a preferred embodiment of a speed variator, illustrated in the accompanying drawings, in which.

DETAILED DESCRIPTION OF THE PREFERRED EMBODIMENTS OF THE INVENTION

With reference to the accompanying drawings, the numeral 1 denotes in its entirety a speed variator according to this invention.

The variator 1 comprises a first frame 2 and a second frame 3, which are hinged to each other about a hinge axis "X" which, in the embodiments illustrated, is positioned horizontally. However, in different embodiments, not illustrated, the hinge axis "X" may be oriented vertically or at any angle.

In the embodiment illustrated, the first frame 2 is fixed, that is to say it can be stably applied to the chassis of a vehicle or a supporting structure, whilst the second frame 3 can move, rotating about the above-mentioned hinge axis "X".

However, according to a different embodiment, the second frame 3 may be fixed and the first frame 2 may be mobile relative to the second frame 3, rotating about the above-mentioned hinge axis "X".

Figure 2:
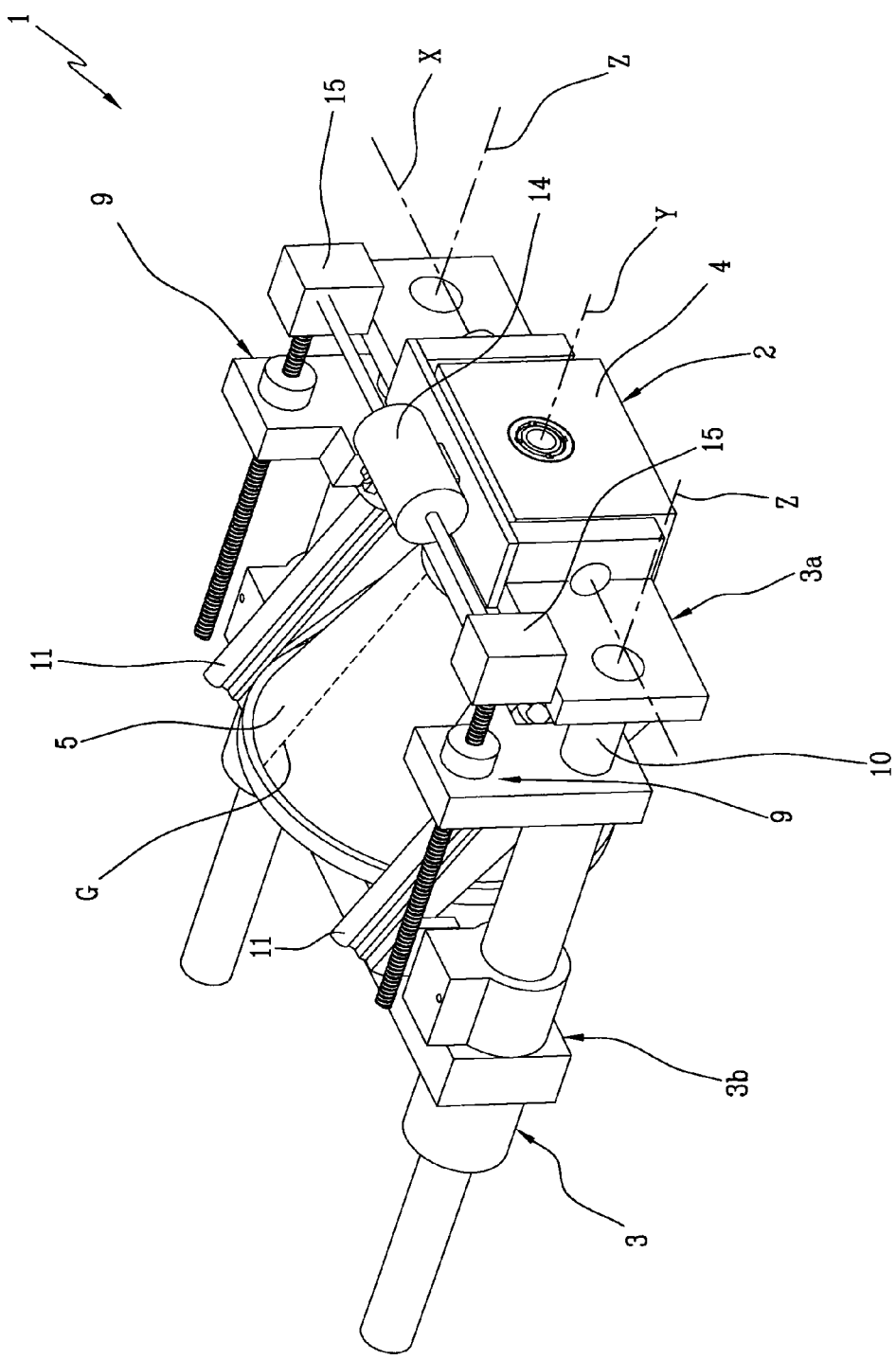
FIG. 2 is a perspective view of the speed variator according to this invention, seen from a second direction of observation.

As shown in FIG. 2, the first frame 2 comprises a supporting element, or base 4, which can be stably connected to a vehicle or a supporting structure (the latter are not illustrated).

Rotatably mounted on the first frame 2, and in particular on the base 4, there is a first element 5, or bell-shaped body, which can rotate relative to the base 4 about a first axis of rotation "Y". In the embodiments illustrated, the axis of rotation is fixed.

The inside of the first element 5 forms a conical or frustoconical rolling surface 6 (frustoconical in the embodiment illustrated), which gives onto the first axis "Y".

The rolling surface 6 is axially symmetric relative to the first axis "Y" and can rotate on itself about the first axis "Y".

The first element 5 is positioned in such a way that the portion of the rolling surface 6 with the smaller diameter is towards the base 4, being mounted cantilever-style on the base 4. That configuration gives the first element 5 the shape of a "bell-shaped body".

Likewise, the first element 5 comprises a mouth, defined by the portion of the rolling surface 6 with the larger diameter, which is open and designed to receive a second element 7 which is normally inserted in the first element 5 and engages by rolling, without scraping, on the rolling surface 6.

The second element 7 is rotatably mounted on the second frame 3 in such a way that it can rotate about a second axis of rotation "W" integral with the second frame 3 and, therefore, able to oscillate about the hinge axis "X" for varying its angle relative to the first axis of rotation "Y".

Therefore, the first and second elements 5, 7 are coupled in rotation, by means of rolling friction, for transmitting a driving torque. One of the two elements 5, 7 is connected to a power takeoff (electric-motor or internal combustion engine, or the like) whilst the other element 5, 7 can be connected to a user device capable of absorbing power.

More specifically, the second element 7 comprises a wheel equipped with a tyre 8, preferably a high pressure tyre and even more preferably of the type designed for inflation pressures higher than 1.2 MPa (approximately 12 bar).

The tyre 8 is toroidal, preferably having an outer profile, considered in cross-section in a plane passing through the axis of rotation "W" of the wheel, which substantially has the shape of a circular arc.

Advantageously, there is an inflation duct 20 having a first end connected to the tyre and a second end fitted with an inflation nozzle 21.

The wheel 7 has a rolling diameter which is substantially equal to or less than the minimum diameter of the rolling surface 6 and, therefore, if the wheel is connected to a power takeoff the variator forms a reduction stage with variable gear ratio.

In contrast, if the bell-shaped body 5 is connected to a power takeoff the variator 1 forms a multiplication stage with variable gear ratio.

Advantageously, the rolling surface 6 (whether conical or frustoconical) and the second axis "W" converge in a point "P".

In particular, the rolling surface 6 and the second axis "W" remain converging in the same point "P" during a reciprocal rotation of the frames 2, 3. This is achieved by ensuring that the point "P" belongs to the hinge axis "X".

The second frame 3 comprises a first portion 3a, which is hinged to the first frame 2 about the hinge axis "X" and comprises at least one main guide 10 parallel with the second axis "W", and a second portion 3b which is slidably mounted on the main guide 10 in such a way that it can slide along a third axis "Z" parallel with the second axis "W".

In the embodiment illustrated, the first portion 3a of the second frame 3 comprises a pair of parallel main guides 10, on which a slide forming the second portion 3b slidably engages.

The wheel 7 is mounted in a stable position on the second portion 3b of the second frame 3 in such a way that it can rotate about the second axis "W" and slide towards and away from the hinge axis "X".

In other words, the second frame 3 comprises two half-frames 3a, 3b which are connected to each other telescopically, and in particular the first half-frame forms the above-mentioned portion 3a whilst the other half-frame forms the second portion 3b of the second frame 3.

The sliding of the second portion 3b of the second frame 3 on the first portion 3a along the axis of rotation "W" of the wheel 7 causes a corresponding translation of the wheel 7 along its axis of rotation "W" and, consequently, causes it to engage on different portions of the rolling surface 6 which have different diameters. The result is a continuous variation of the gear ratio between the wheel 7 and the bell-shaped body 5.

In order to produce the continuous variation in the gear ratio of the variator, there are movement means 9, acting between the wheel 7 and the bell-shaped body 5 for making the wheel 7 and the bell-shaped body 5 move towards and/or away from each other in such a way as to make the wheel 7 engage with different portions of the rolling surface 6.

The movement means 9 are described below.

Following the above-mentioned kinematic coupling between the wheel 7 and the bell-shaped body 5, the two frames 2, 3 form an angle between them, about the hinge axis "X", which is determined directly by the reciprocal contact between the wheel 7 and the rolling surface 6, and said angle varies continuously according to the movement of the wheel 7 along the second axis "W".

In other words, each positioning of the wheel 7 according to a predetermined degree of insertion in the bell-shaped body 5 gives in a bijective way a corresponding gear ratio between the wheel 7 and the bell-shaped body 5 and a corresponding angle of rotation between the two frames 2, 3.

The wheel 7 is supported by a supporting shaft 19a rotating inside a supporting casing 19, which extends along the second axis "W", coaxial with the latter, and allows the rotation of the wheel 7 about the second axis "W".

As shown in the accompanying drawings, the supporting casing 19 is supported cantilever-style by the second portion 3b of the second frame 3.

In accordance with a possible alternative embodiment, the second portion 3b of the frame 3 may be incorporated in the supporting casing 19. In particular, in that case the second portion 3b of the second frame 3 would comprise the stator of an electric motor for moving the wheel 7. In such a case, the stator of the electric motor is integral with the second portion 3b of the second frame 3, that is to say, it is the supporting casing 19, whilst the rotor is rotatably mounted on the second portion 3b of the second frame 3 in such a way that it can rotate about the second axis W, that is to say, it is the shaft 19a, and the wheel 7 is stably connected to the rotor to receive driving power. In this configuration, the rotor of the electric motor forms the above-mentioned supporting shaft 19a, whilst the stator of the electric motor forms the above-mentioned supporting casing 19.

Advantageously, inside the supporting shaft 19a there is a duct forming the inflation duct 20 of the tyre 8.

At the end opposite that connected to the wheel 7, the inflation duct 20 comprises an inflation nozzle 21, preferably projecting from the supporting shaft 19a or from the second frame 3. The inflation operation may advantageously be performed by means of an inflation tube 22, which oscillates between a home position (visible for example in FIG. 8) in which it is distanced from the inflation nozzle 21 and an operating position in which it abuts against the inflation nozzle 21, allowing fluid communication between the inflation duct 20 and a source of compressed air (not illustrated).

According to an embodiment not illustrated, the variator 1 is set up to adopt an operating configuration in which the wheel 7 is kept pressed against the rolling surface 6 at least by the weight of the second frame 3 (and if necessary also by the weight of the electric motor where present) and of the wheel 7. Therefore, in that configuration, the wheel 7 rests against a lower portion of the rolling surface 6 and the pressing force acting on the wheel 7 is substantially constant and linked to the weight of the second portion 3b of the second frame 3, pressing directly on the wheel 7.

According to an advantageous alternative embodiment of the invention, there are suitable thrust means (not illustrated), acting on the second frame 3 to produce a thrust on the wheel 7, pushing it against the rolling surface 6. The thrust means preferably act between the second frame 3 and a fixed portion of the first frame 2 (or a suitable supporting portion connected to the base 4).

The thrust means may comprise, for example, a spring acting on the second frame 3 for pushing the wheel 7 against the rolling surface 6.

According to a different embodiment, illustrated in the accompanying drawings, the variator 1 also comprises adjusting means 16 acting between the wheel 7 and the bell-shaped body 5 for adjusting the contact force transmitted between them, that is to say, for pressing the wheel 7 onto the rolling surface 6 with a force whose extent is variable and controllable.

The adjusting means 16 preferably comprise a hydraulic or pneumatic actuator 17, set up to set a variable and controllable contact force between the wheel and the bell-shaped body 7, 5. According to alternative embodiments not illustrated, it is possible to use other types of actuators able to apply a variable and controllable force, for example an electromagnet or a spring preloaded by a cam.

According to a particularly advantageous aspect of the invention, the actuator 17 is engaged in such a way that it applies a pressing action on the wheel 7 and, at the same time, in such a way that it performs the least work possible, or even no work at all.

To do that, the actuator 17 is mounted between the two frames 2, 3 in such a way that one end of the actuator. 17 is applied to the second frame 3, and in particular to its second portion 3b (said end of the actuator 17 therefore also slides along the second axis "W"), and in such a way that the other end of the actuator 17 can move on a trajectory parallel with the trajectory followed by the ideal point of contact between the wheel 7 and the rolling surface 6. In that situation, the two ends of the actuator 17 remain substantially at the same distance from each other, therefore there is no work done by the actuator 17.

To do that, the first frame 2 is equipped with at least one fixed auxiliary guide 11, and at least one shoe 12 slidably engaging with the auxiliary guide 11 in such a way that it can slide on it.

In the embodiment illustrated, the first frame 2 has two fixed auxiliary guides 11, which are positioned on opposite sides of the bell-shaped body 5, and a respective shoe 12 is slidably mounted on each of the auxiliary guides 11. Associated with each shoe 12 there is a respective actuator 17, as described below.

Advantageously, each auxiliary guide 11 extends along a straight line parallel with the straight line enveloping the ideal points of contact between the wheel 7 and the bell-shaped body 5 with variations in the gear ratio, in such a way as to follow the trajectory adopted by the wheel 7 during its translation along the second axis "W".

The above-mentioned second end of each actuator 17 is applied to the respective shoe 12 to follow the auxiliary guide 11 in such a way as to minimise, or even cancel out, the stroke of the actuator 17 during the variation of the gear ratio of the variator 1.

It is possible to state that each auxiliary guide 11 extends along a straight line which is parallel with a generatrix of the rolling surface 6 (conical or frustoconical) identified by the intersection between the rolling surface 6 and a plane passing through the second axis "W" and perpendicular to the hinge axis "X".

Figure 1:
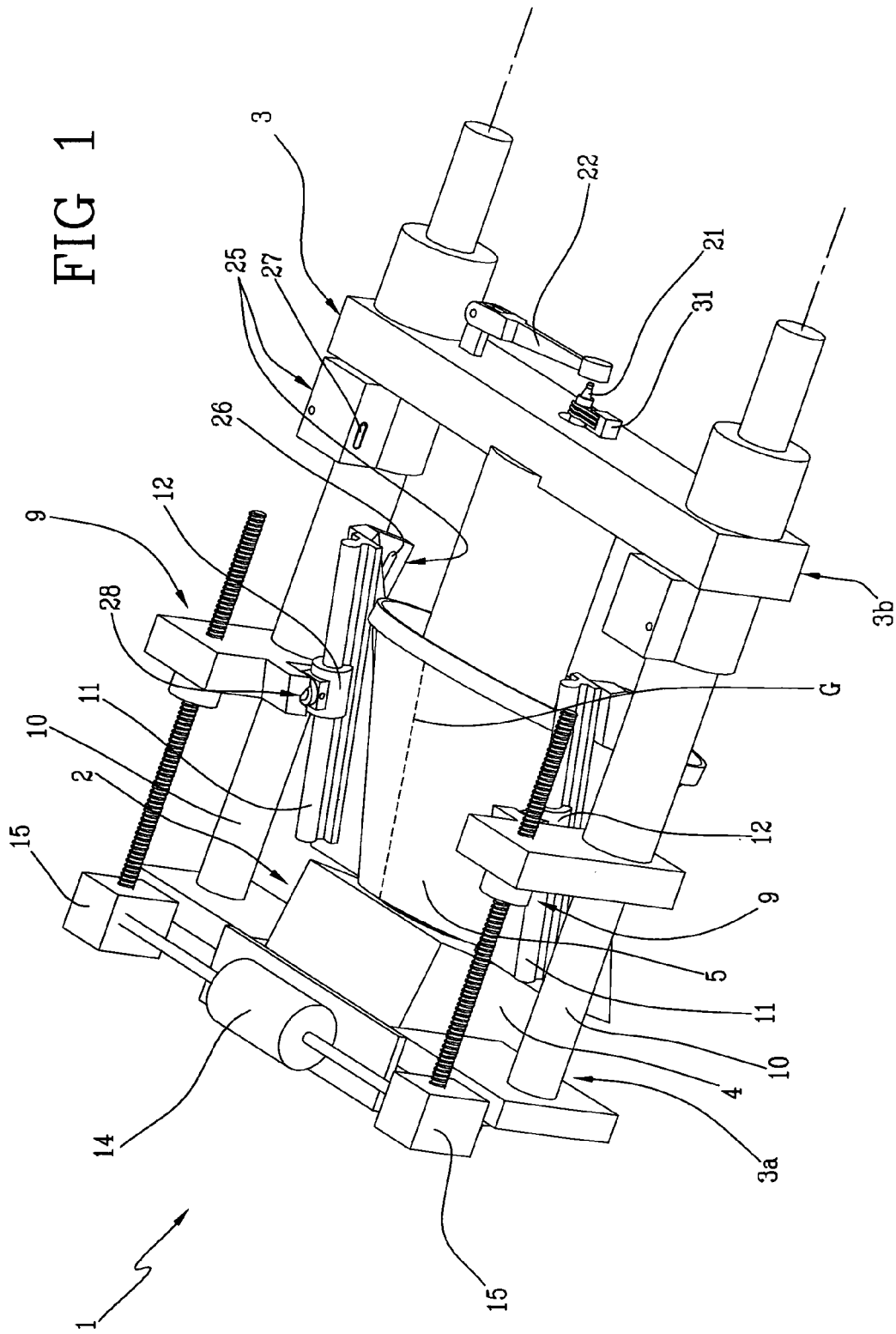
FIG. 1 is a perspective view of the speed variator according to this invention, seen from a first direction of observation.

In other words, according to the view in FIGS. 1 and 2, the generatrix considered (parallel with which the auxiliary guide 11 is positioned) is the top generatrix, identified by the intersection between the rolling surface 6 and a vertical plane passing through the second axis "W".

Said generatrix is labelled "G" in the views in FIGS. 1 and 2.

Figure 3:
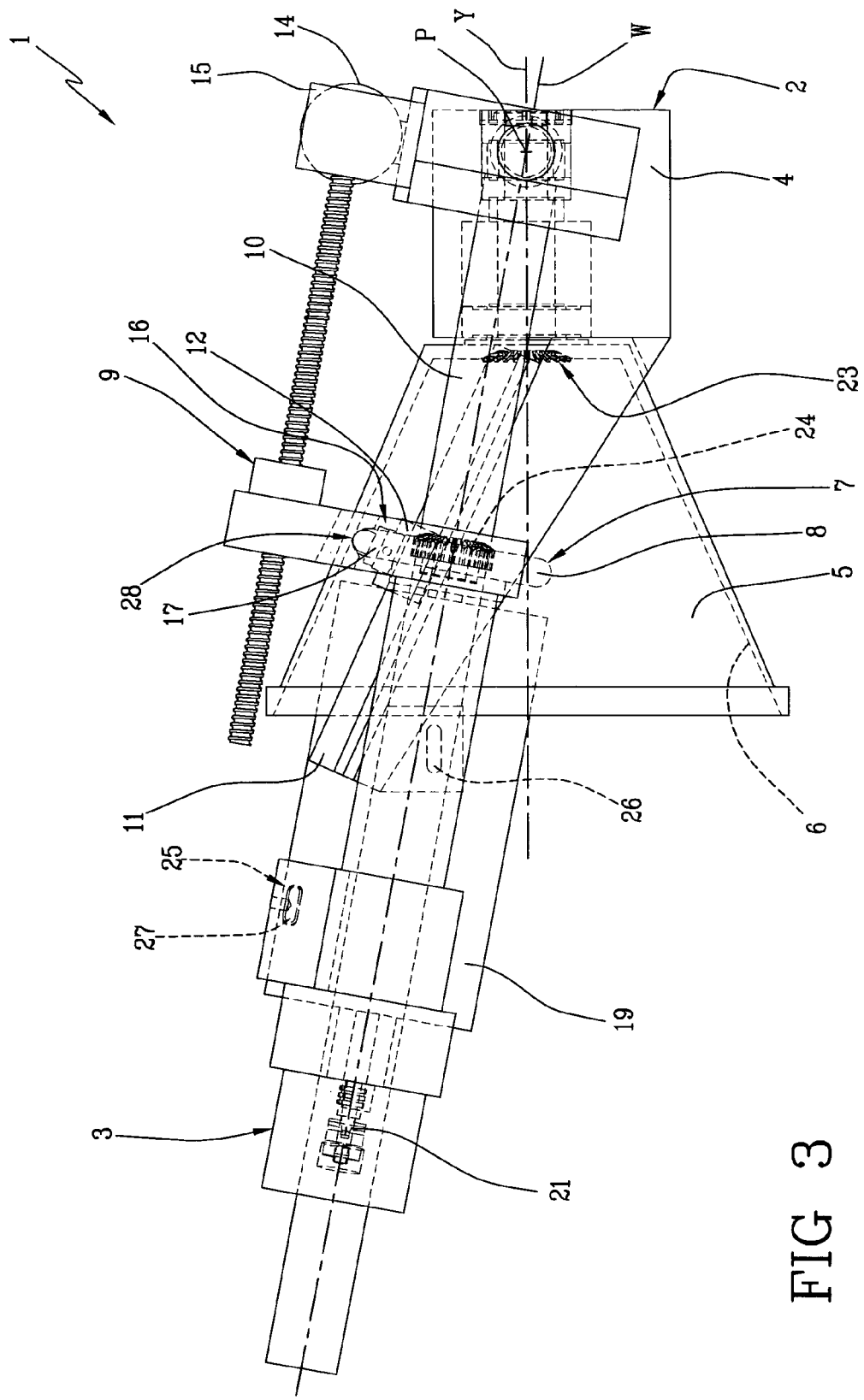
FIG. 3 is a side view of the variator of FIG. 1 in a first operating configuration defining a reduction/multiplication ratio.
Figure 4:
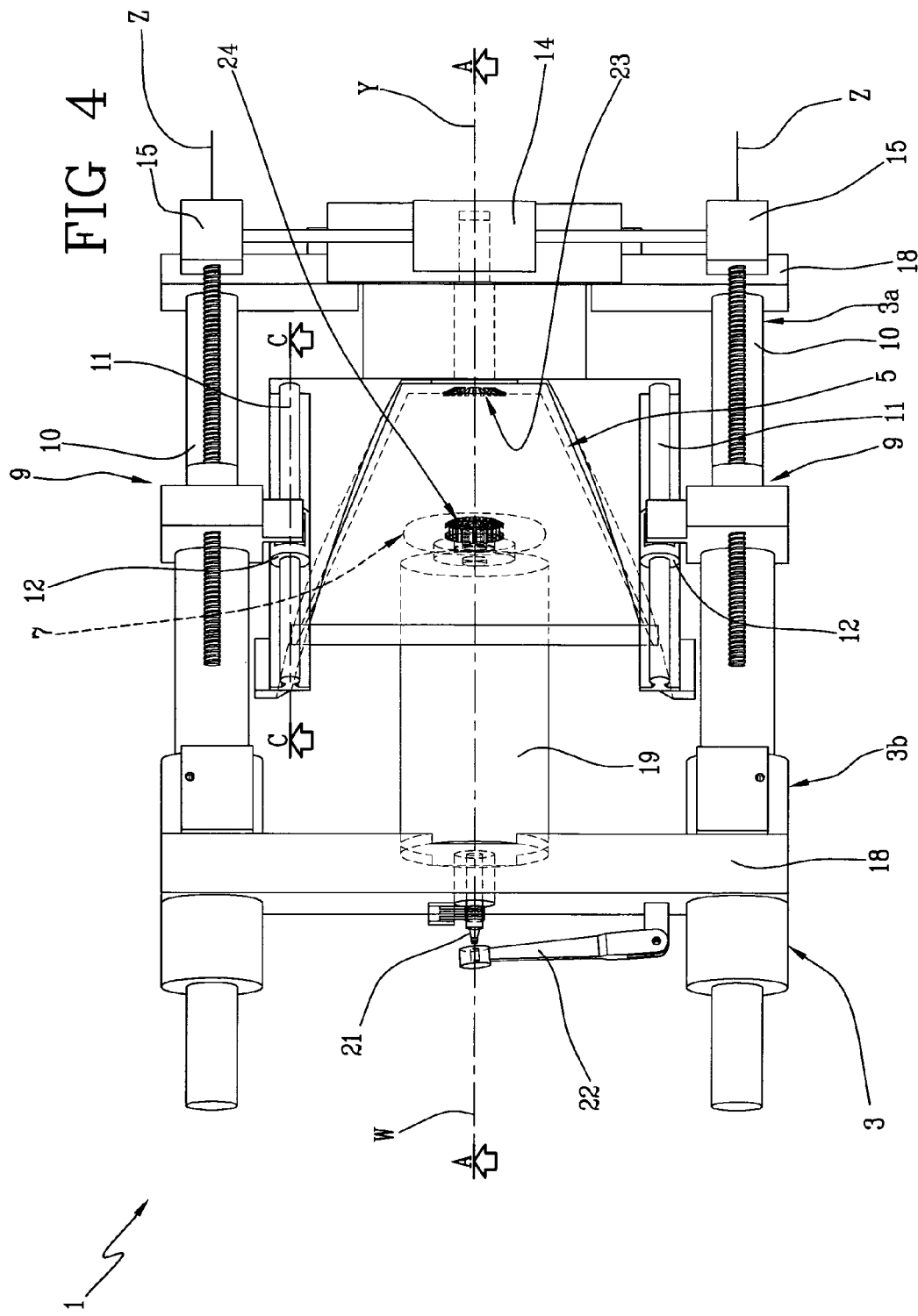
FIG. 4 is a plan view of the variator of FIG. 1 in the first operating configuration.
Figure 5:
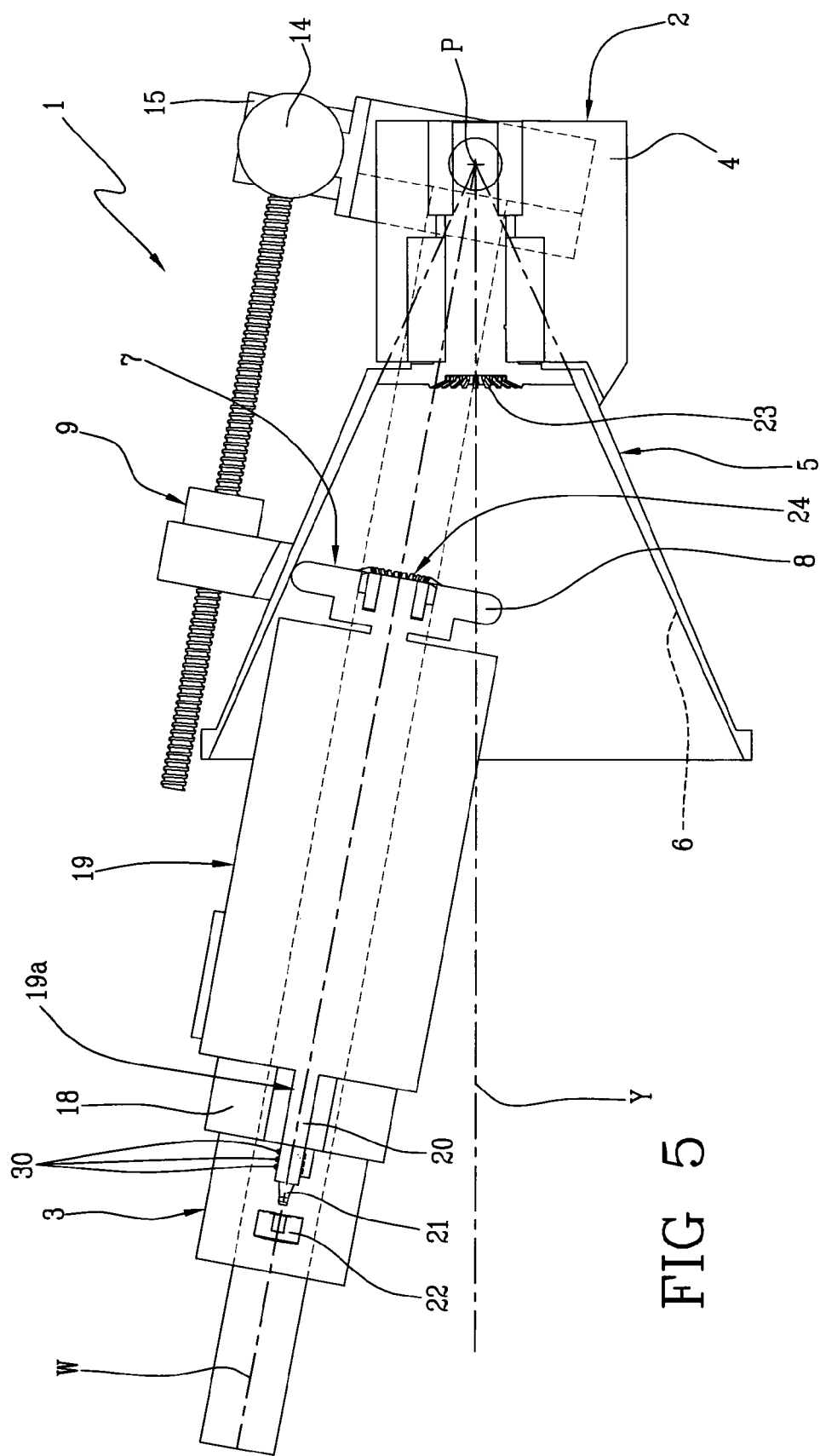
FIG. 5 is a cross-section according to the line A-A from FIG. 4, of the variator of FIG. 1 in the first operating configuration.
Figure 6:
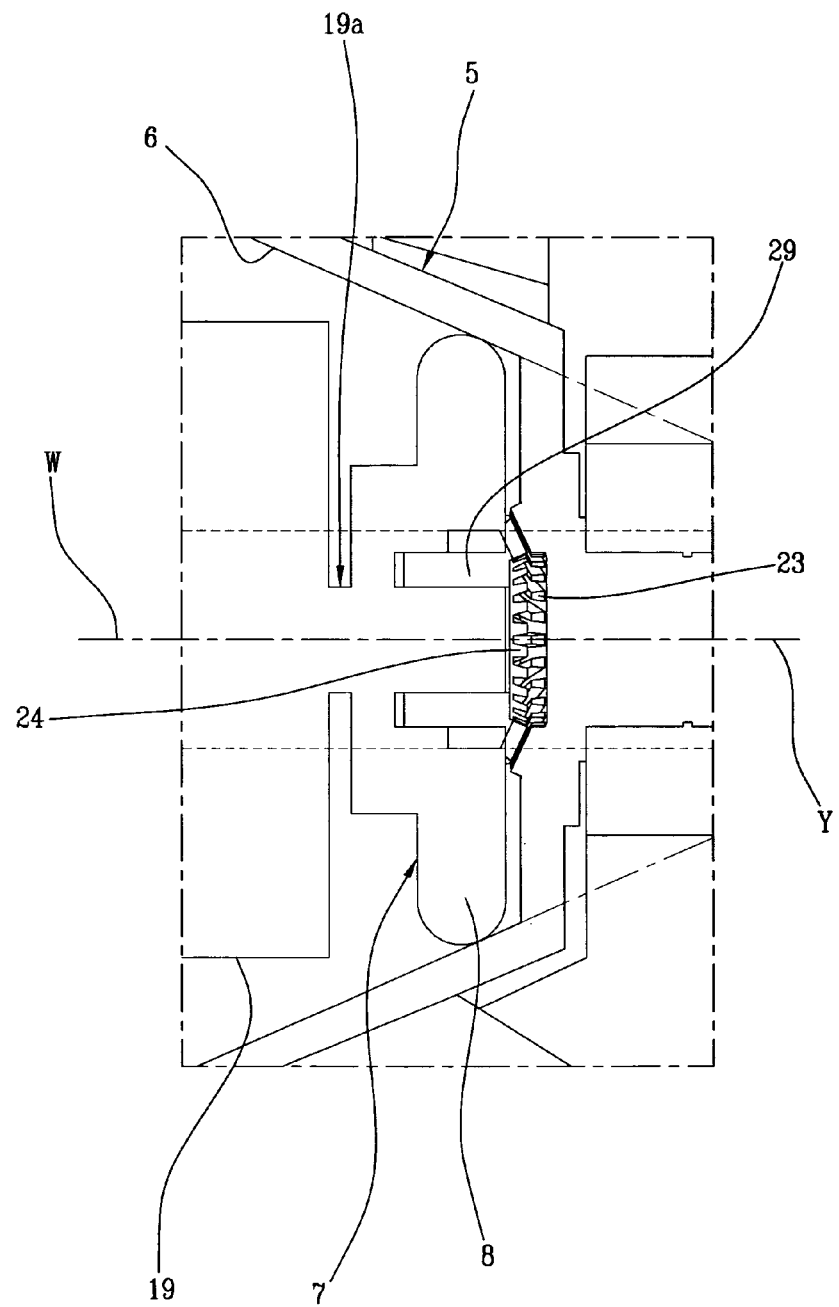
FIGS. 6 and 7 are enlarged views of a first embodiment of a portion of the variator illustrated in FIG. 5, in different operating configurations relating to direct drive engagement.
Figure 7:
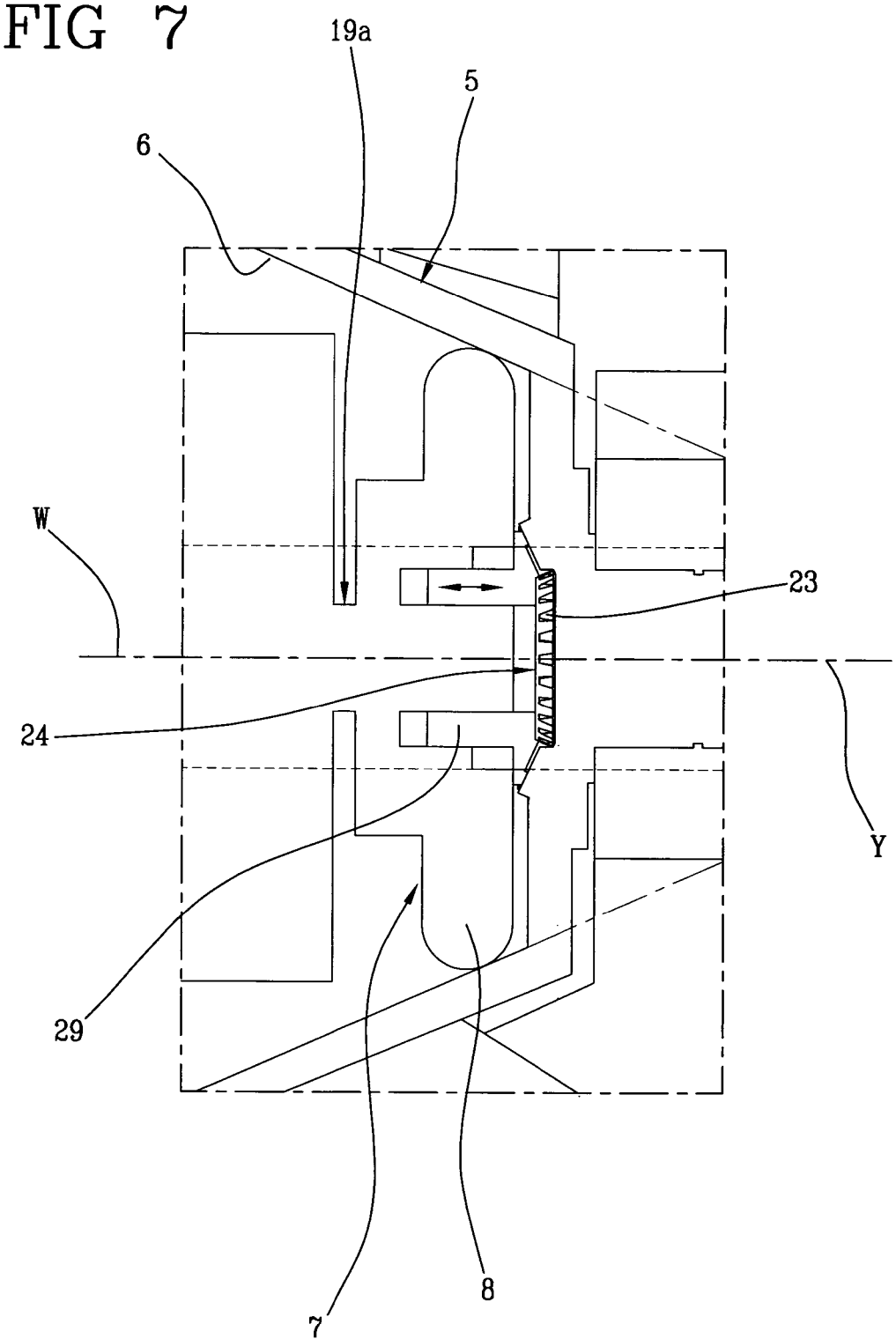
Figure 10:
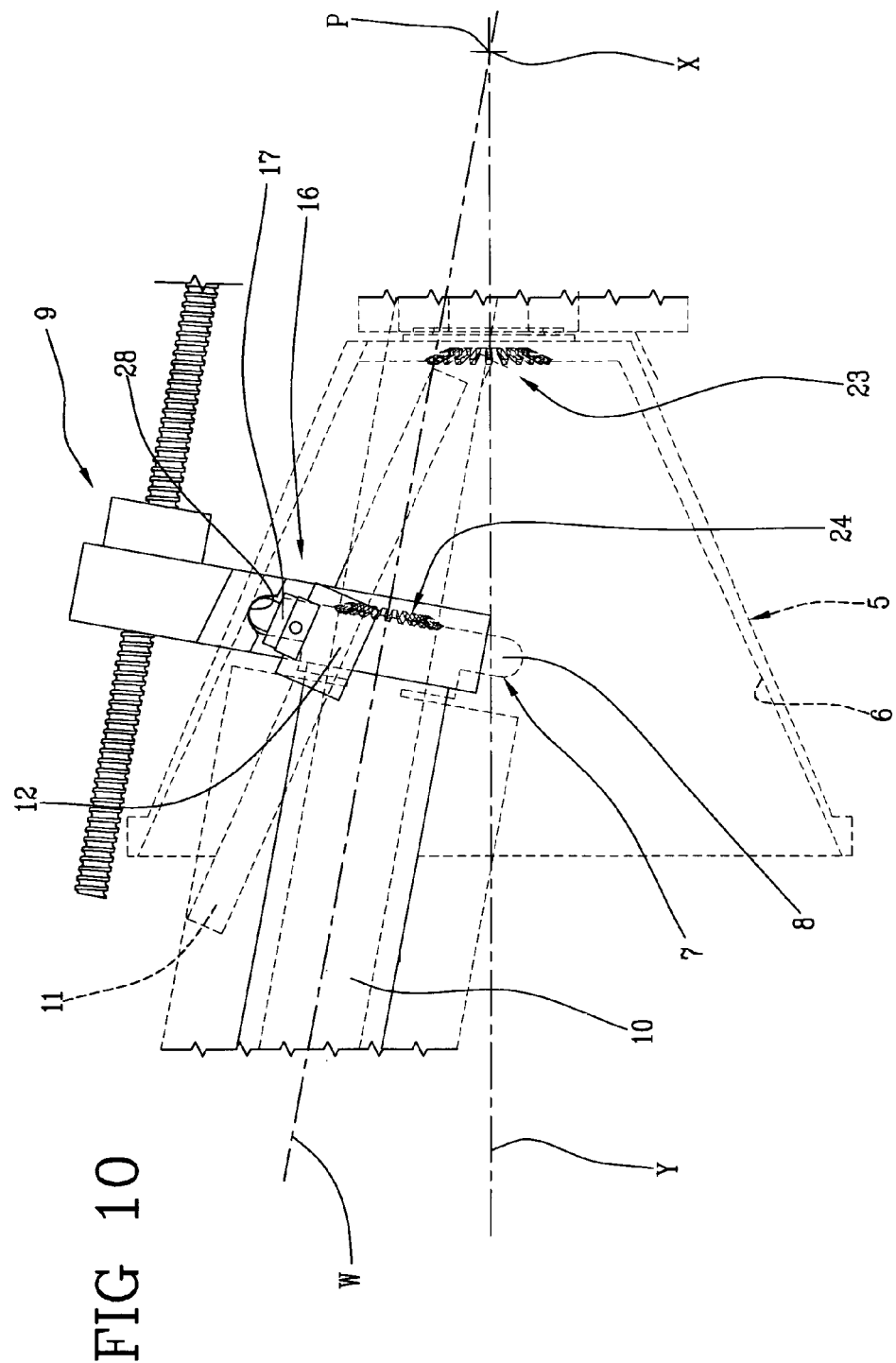
FIG. 10 is a view which is partly in cross-section according to the line C-C from FIG. 4, and with some parts cut away to better illustrate others, of the variator of FIG. 1.

As FIGS. 1, 3 and 10 show, the second portion 3b of the second frame 3 comprises a receiving portion 28, at least partly and in a cross-section view, shaped to match the above-mentioned circular arc-shaped outer profile of the tyre 8. The first end (upper in the view in FIG. 10) of the actuator 17 is applied to the receiving portion 28.

The first end of the actuator 17 which rests on the receiving portion 28 is also preferably rounded.

According to the form of the coupling between the actuator 17 and the receiving portion 28, the thrust applied by the actuator 17 is always directed perpendicularly to the auxiliary guide 11 and therefore perpendicularly to the surface 6 on the generatrix G. This allows a correct kinematic thrust to be obtained which prevents the actuator 17 from opposing the translation of the wheel 7 along the second axis "W" necessary for varying the gear ratio, with the consequent elimination of power dissipation.

Figure 11:
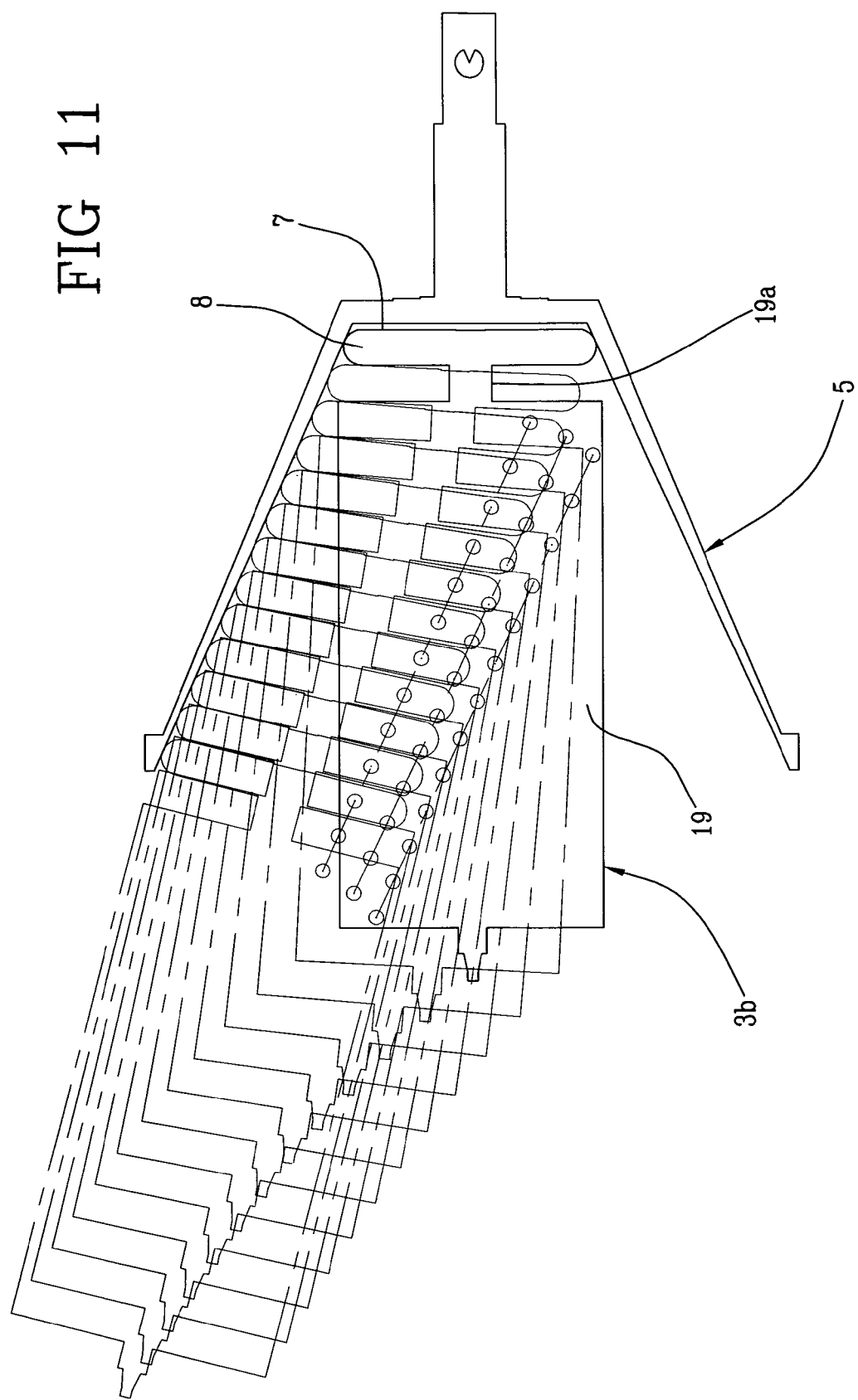
FIG. 11 is a partly schematic cross-section of the variator of FIG. 1 according to a sequence of operating positions.

The drawing in FIG. 11 shows several points on the second portion 3b of the second frame 3, and their trajectory, which have the feature of having a trajectory which is practically linear with variations in the gear ratio. To build a compact variator 1 and keep the work of the actuator 17 practically null, it is possible to position the receiving portion 28 at one of these points, and the respective auxiliary guide 11 parallel with the trajectory followed by the point considered.

Preferably, the wheel 7 and the shoe 12 are substantially equidistant from the hinge axis "X". Since they are integral with each other thanks to the second portion 3b of the second frame 3, they move by the same amount during the translation along the second axis "W" therefore, always remaining equidistant from the hinge axis "X" as time passes. In other words, the wheel 7 and the shoe 12 substantially lie in the same plane perpendicular to the second axis "W".

Each shoe 12 is pulled in such a way that it slides on the respective auxiliary guide 11 by the sliding movement of the second portion 3b of the second frame 3 along the third axis "Z".

The movement means 9 act directly on the second, portion 3b of the second frame 3 and preferably act between the first and second portions 3a, 3b of the second frame 3.

Preferably, the movement means 9 comprise a generic actuator designed to produce a translation of the second portion 3b of the second frame 3 on the main guides 10.

In the embodiment illustrated, the actuator used is of the male and female screw type, preferably with recirculating ball screws, moved for example by an electric motor 14 by means of respective transfer cases 15. According to alternative embodiments which are not illustrated, the actuator used may be a hydraulic or pneumatic cylinder, a belt or a rack-and-pinion gear.

According to an advantageous aspect of this invention, the variator 1 is set up to also allow direct drive engagement, that is to say, with a unit gear ratio between the wheel 7 and the bell-shaped body 5.

FIGS. 6 to 9 illustrate the methods with which direct drive is achieved.

According to a first embodiment, illustrated in FIGS. 1 to 7, the rolling surface 6 is entirely frustoconical and comprises, on its base portion, an engagement portion 23 equipped with meshing teeth able to mesh directly with a corresponding front toothing 24 of the wheel 7 to create a coupling which is integral in rotation between the wheel 7 and the bell-shaped body 5. Said coupling, with direct front engagement, occurs when the wheel 7 is in a configuration of maximum insertion in the bell-shaped body 5.

According to this configuration, the front of the wheel 7 comprises a bushing with a grooved profile 29 supporting the front toothing 24 and able to slide along the second axis "W" in such a way that, when the wheel 7 is close to the engagement portion 23, the meshing of the front toothing 24 with the engagement portion 23 is possible by means of simply sliding (extracting) the bushing 29 along the second axis "W". This may be done using an actuator positioned between the wheel 7 and the bushing 29 which is controlled by means of sliding contacts 30 supported by a block 31.

Simultaneously with direct drive engagement, the adjusting means 16 are disabled whilst suitable locking means 25 are activated, being designed to stably lock (without action by the adjusting means 16) the position of the wheel 7 relative to the bell-shaped body 5. In particular, the locking means 25 are designed to lock the wheel 7 and the bell-shaped body 5 in an axially aligned position, that is to say, corresponding to superposing of the first and second axes "Y", "W".

As shown in FIG. 1, the locking means 25 comprise a slot 26, made in a portion of the first frame 2, for example made in a portion of a respective auxiliary guide 11, and an engagement element 27, applied to the second frame 3 (and preferably to the first portion 3a of the latter) and able to move between a retracted position (FIG. 1) in which it allows reciprocal rotation of the two frames 2, 3 and an extracted position (not illustrated) in which it is inserted in the slot 26 and stops reciprocal rotation of the two frames 2, 3.

Figure 8:
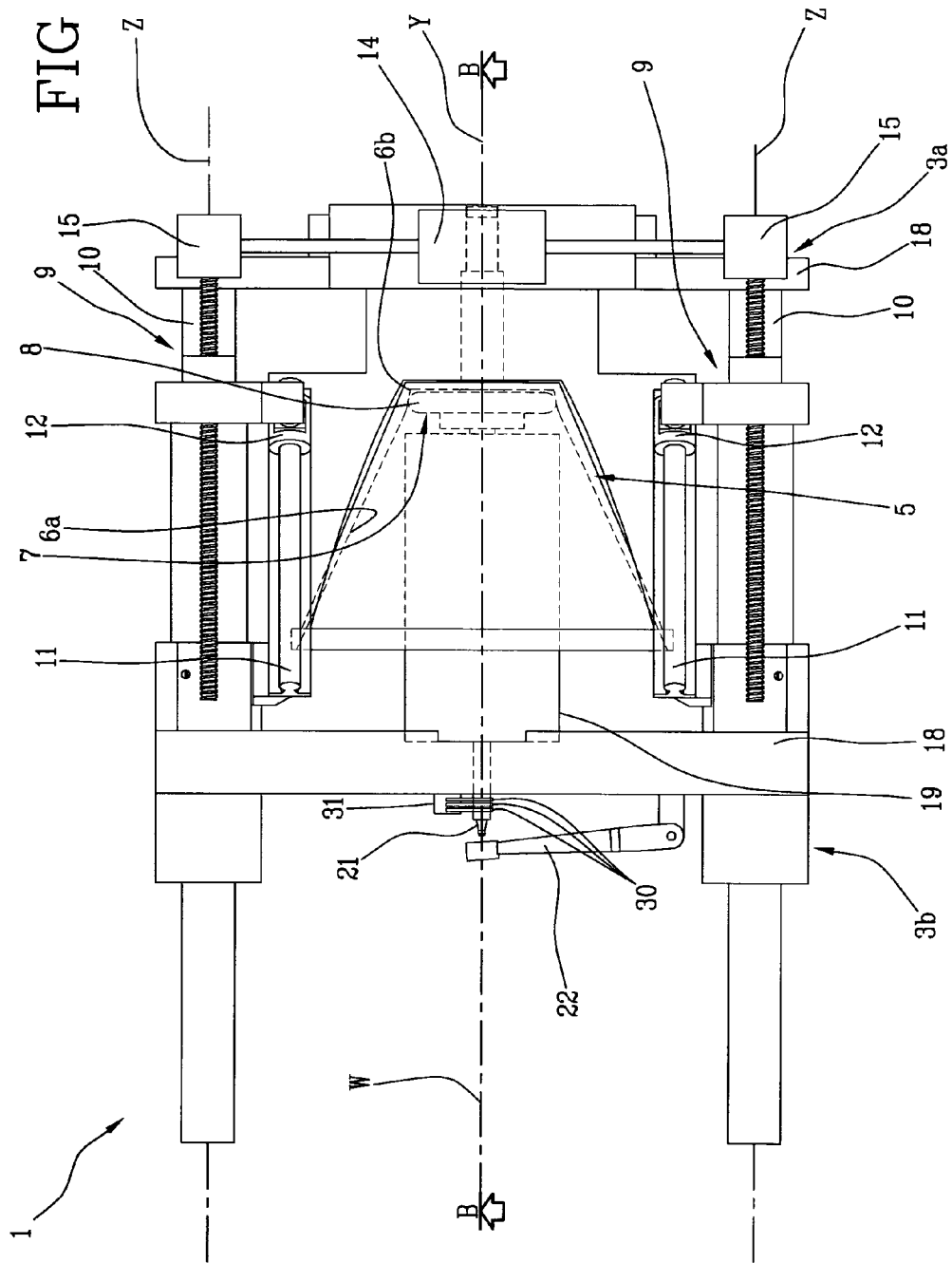
FIG. 8 is a plan view of a second embodiment of the variator of FIG. 1 in an operating configuration relating to direct drive engagement.
Figure 9:
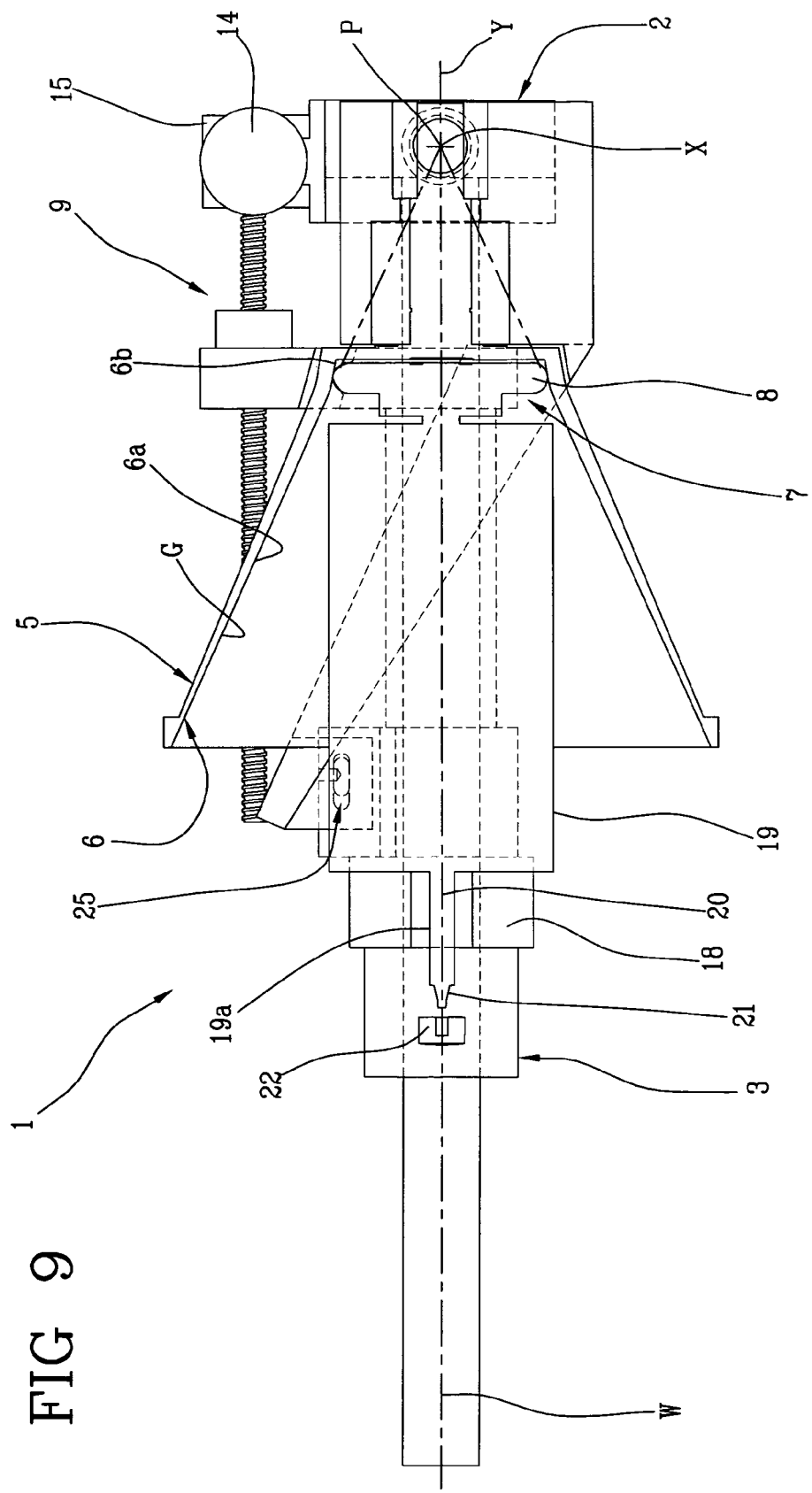
FIG. 9 is a cross-section according to the directrix B-B from FIG. 8 of the variator of FIG. 8.

In accordance with a second embodiment, illustrated in FIGS. 8 and 9, the rolling surface 6 comprises a first, frustoconical portion 6a converging in the point "P", and a second portion 6b, coaxial with the first portion 6a and having less conicity than the first portion 6a, that is to say, forming a smaller angle relative to the second axis "W" than the first portion 6a of the rolling surface 6.

The second portion 6b of the rolling surface 6 is adjacent to the first portion 6a and positioned deeper than the first portion 6a relative to the direction of insertion of the wheel 7 in the bell-shaped body 5.

Advantageously, the second portion 6b of the rolling surface 6 is shaped in such a way that it receives and retains with interference the wheel 7, for producing a coupling which is stable and coaxial in rotation about the first axis of rotation "Y" between the wheel 7 and the bell-shaped body 5.

In particular, the second portion 6b of the rolling surface 6 comprises at least one portion with a diameter which is less than the external diameter of the tyre 8 in such a way that, when the wheel 7 is axially inserted in the bell-shaped body 5 and pushed by the movement means 9, the tyre 8 impacts against the second portion 6b and then remains stably retained by interference in the bell-shaped body 5.

To achieve this second possibility of direct drive engagement, in a position close to the 1:1 ratio, three actions are performed simultaneously:

a) the movement means 9 push the wheel 7 axially towards the bottom of the bell-shaped body 5 with a calibrated force;

b) the adjusting means 16 are disabled, releasing the actuators 17;

c) the locking means 25 are engaged, so that the first and second axes "Y", "W" coincide and remain that way.

With this direct drive method the rolling friction is practically null, since the first and second axes "Y", "W" coincide with each other, and the force resulting from the pressure between the wheel 7 and the bell-shaped body 5 coincides with their axis of rotation.

FIGS. 12 to 16 show an alternative embodiment of the variator 1 according to this invention, which has the advantage of being very compact.

In this embodiment, the very compact dimensions are achieved by making use of the space inside the bell-shaped body 5.

This embodiment differs from that illustrated in FIGS. 1 to 10 due to several differences which are described below.

In particular, the second portion 3b of the second frame 3 is formed by the supporting casing (or stator) 19 of an electric motor, which is positioned coaxially to the second axis of rotation "W" and can move towards and away from the bell-shaped body 5, until it is at least partly inserted in it.

The first portion 3a of the second frame 3, as in the embodiment illustrated in FIGS. 1 to 10, is hinged to the first frame 2.

Advantageously, the base 4 of the variator 1 consists of the differential of a motor car. To avoid the transmission of excessive pulling, the differential may be connected to the chassis of the motor car by means of rubber anti-vibrating supports.

Therefore, the bell-shaped body 5 may be directly connected to the differential input shaft.

The electric motor supporting casing 19 is supported cantilever-style by the first portion 3a of the second frame 3 and is slidably connected to the latter by a pair of main guides 10 which are positioned inside the bell-shaped body 5 and which project outside the bell-shaped body 5 on the side where its opening is located.

Figure 12:
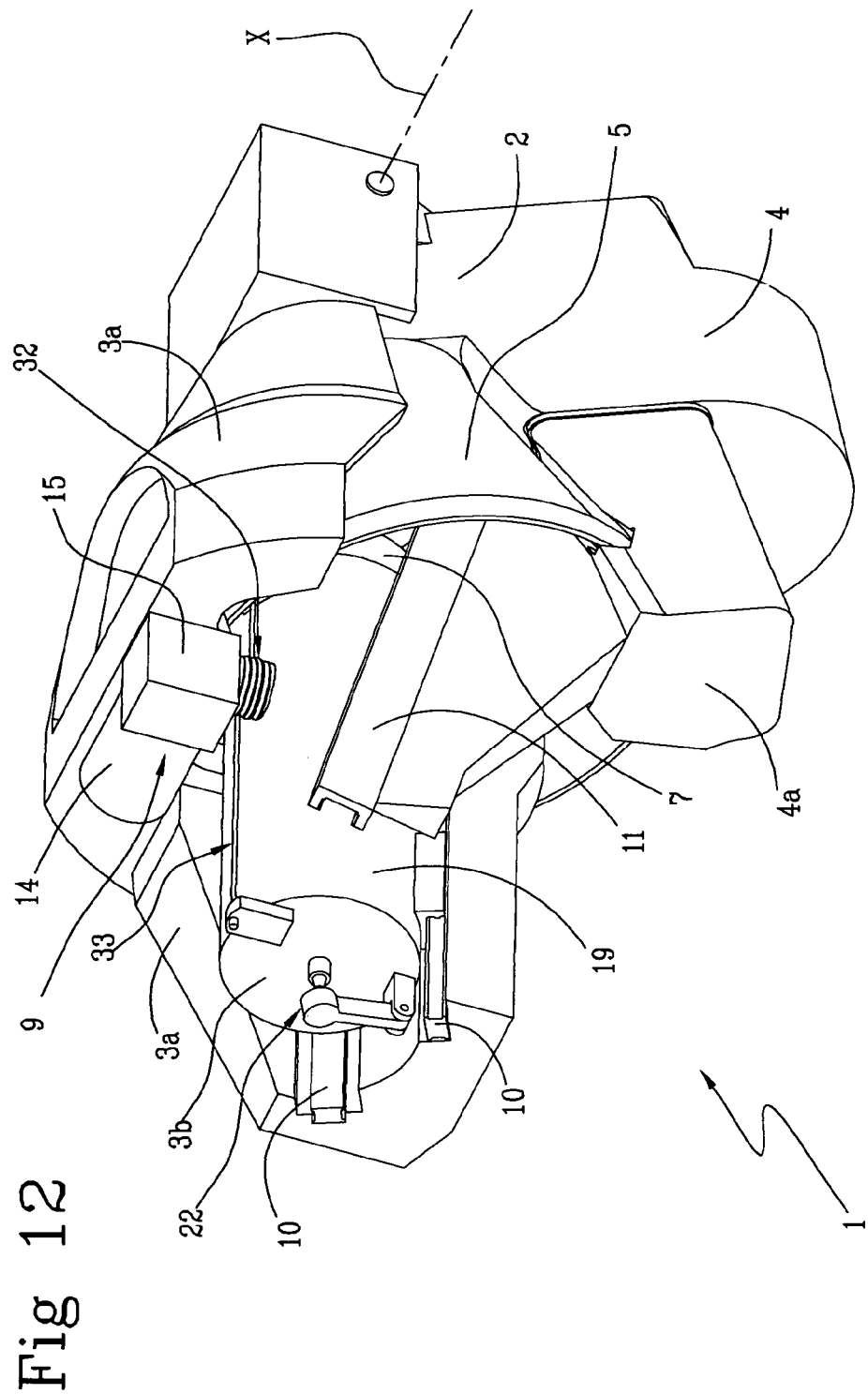
FIG. 12 is a perspective view of an alternative embodiment of a variator according to this invention.
Figure 16:
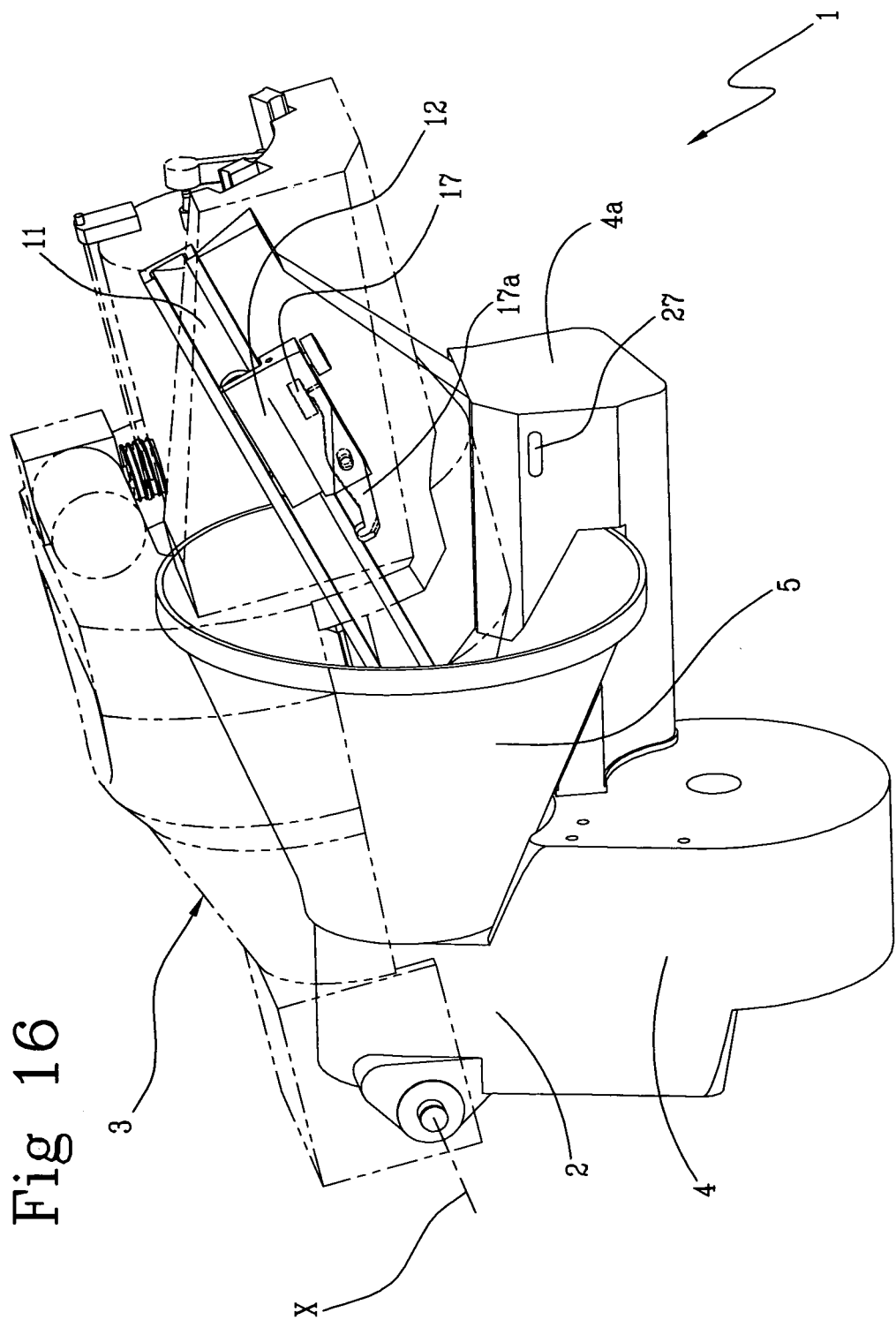
FIG. 16 is a perspective view of the variator of FIG. 12 with some parts omitted and other parts rendered transparent to better illustrate hidden parts of the variator.

Advantageously, to increase the compactness of the variator 1, both of the main guides 10 are supported by a single arm forming the first portion 3a of the second frame 3. Said single arm is positioned so that it is laterally alongside the bell-shaped body. 5 and its shape is such that it surrounds the bell-shaped body 5 on one side (FIGS. 12 and 16). The arm also extends cantilever-style inside the bell-shaped body 5 to support the main guides 10.

Figure 13:
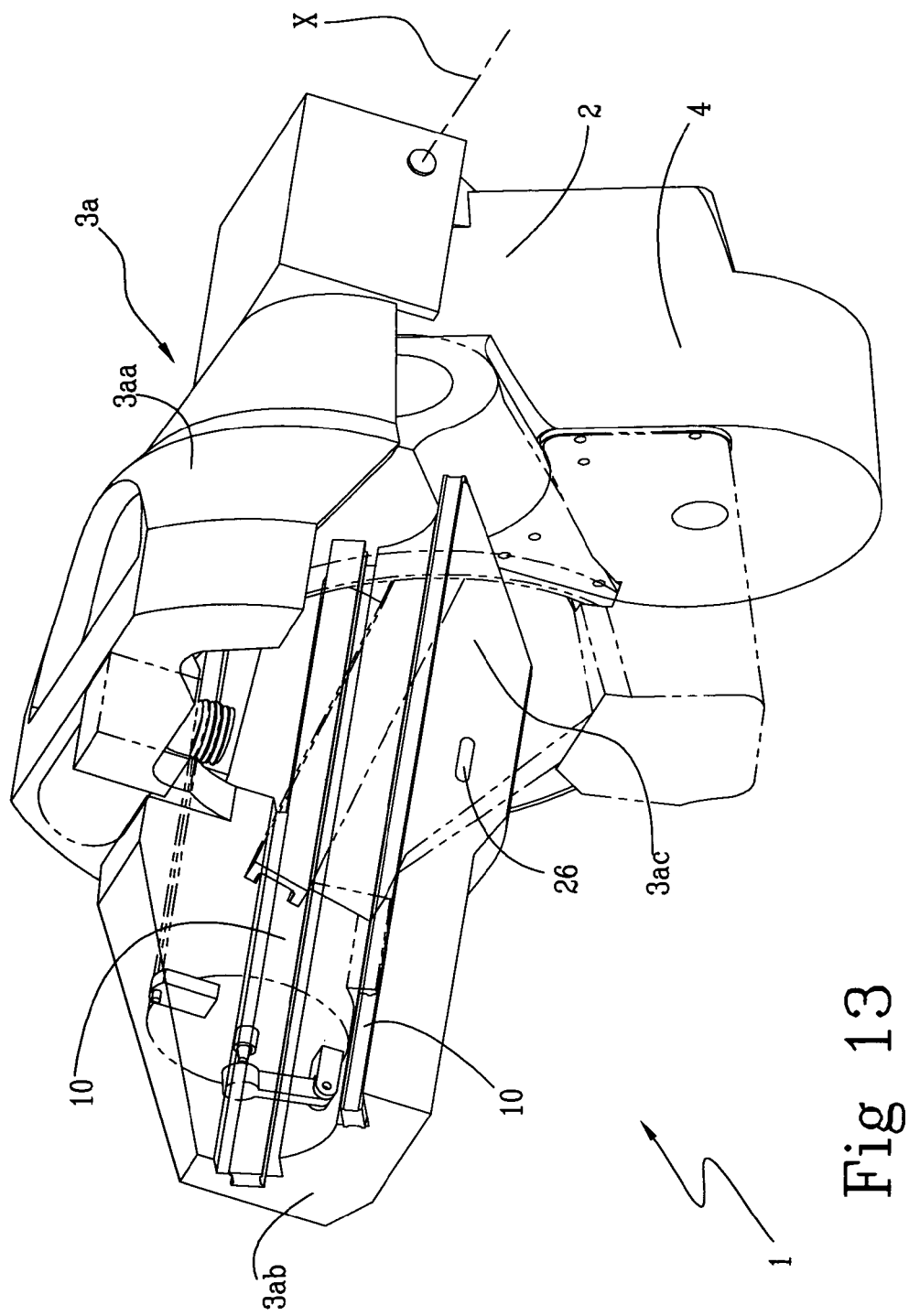
FIGS. 13 and 14 are perspective views of the variator of FIG. 12 with some parts rendered transparent to better illustrate its hidden parts.
Figure 14:
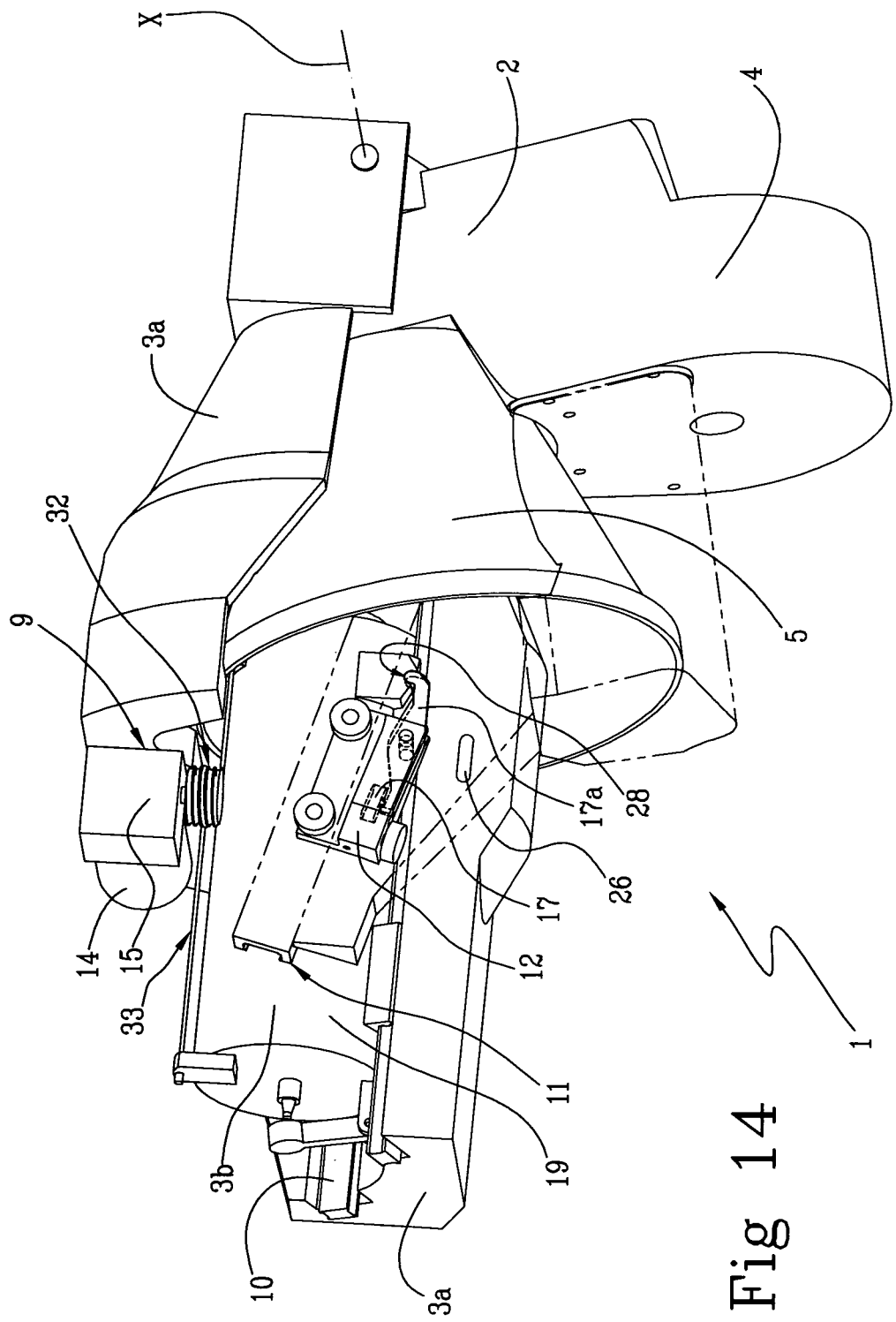
Figure 15:
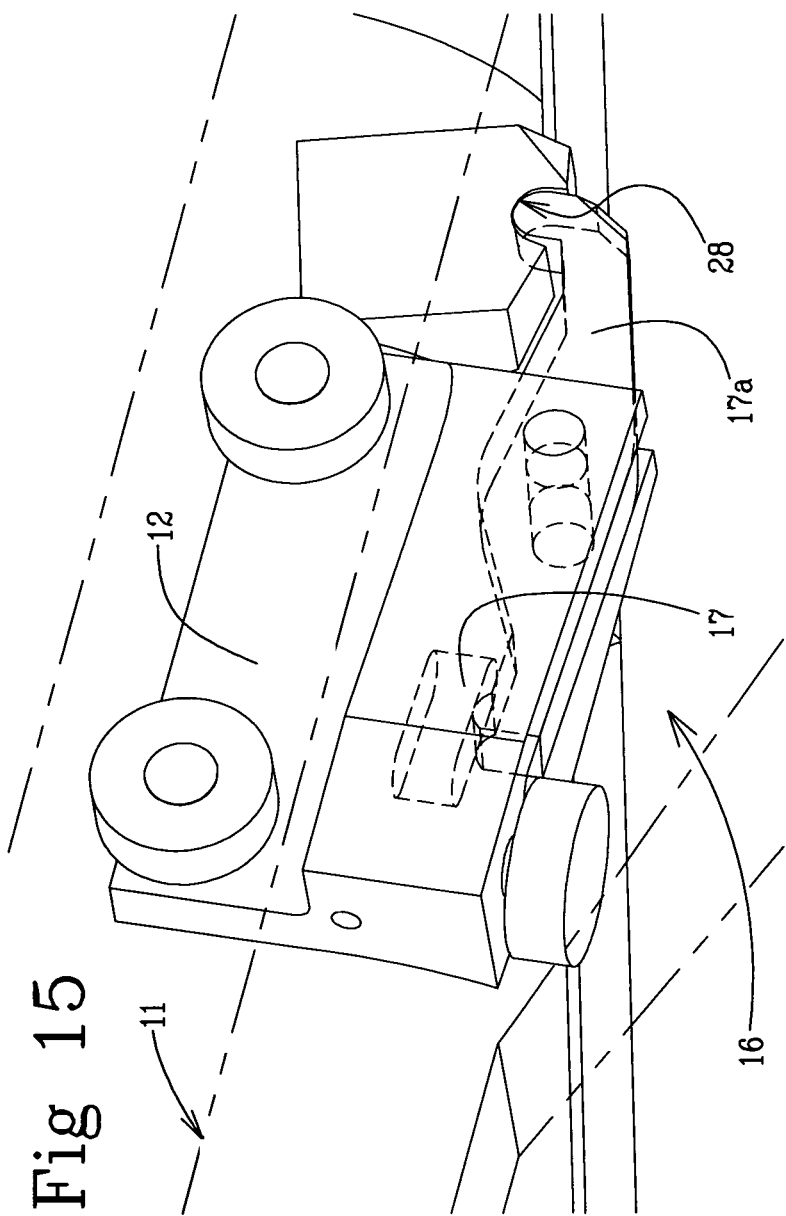
FIG. 15 is a perspective view of a detail of the variator of FIG. 12.

In more detail, as shown in FIG. 13, the first portion 3a of the second frame 3 is formed by a first segment 3aa which surrounds the bell-shaped body 5 and the base (or differential) in the zone in which it is hinged on the hinge axis "X", a second segment 3ab projecting from the opening in the bell-shaped body 5 and a third segment 3ac which enters the opening in the bell-shaped body 5. This shape allows a very compact structure and at the same time allows the electric motor to be very rigidly supported.

The movement of the electric motor (to whose rotor shaft the wheel 7 is applied) along the main guides. 10 is preferably performed using cable-type movement means 9.

Said movement means 9 comprise a pulley 32 on which a cable 33 is wound once. The ends of the cable are stably fixed to opposite ends of the supporting casing 19 of the electric motor.

The pulley 19 comprises a spiral groove (similar to the thread of a screw) and consequently the two branches of cable, extending from the pulley to the two ends of the supporting casing 19, are not aligned but are parallel with each other and spaced by a distance equal to the pitch of the spiral groove of the screw (which is slightly greater than the thickness of the cable).

In the embodiment illustrated in FIGS. 12 to 16 a single auxiliary guide 11 (fixed to the base 4) is used rather than two, and it is positioned inside the bell-shaped body 5 parallel with the trajectory described in FIG. 11.

Slidably mounted on the auxiliary guide 11 there is a shoe 12, preferably equipped with wheels housed in a groove in the auxiliary guide 11.

In this embodiment, the adjusting means have the receiving portion 28 made directly on the electric motor supporting casing 19.

Moreover, for the transmission of a force between the auxiliary guide 11 and the electric motor supporting casing 19 (therefore between the auxiliary guide 11 and the wheel 7) a drive lever 17a is used which is centrally hinged to the shoe 12 and has a first end engaged in the receiving portion 28 of the supporting casing 19 and another end engaged with an actuator 17, which is also mounted on the shoe 12. In this way, the actuator 17 is inside the shoe 12 and transmits its force to the receiving portion 28 by means of the drive lever 17a. This configuration, together with the structure of the shoe 12, allows the contact point between the lever 17a and the receiving portion 28 to be positioned close to the points described in FIG. 11. It should be noticed that the drive lever 17a is not necessarily parallel with the auxiliary guide 11 and is suitably shaped in such a way that it can easily be inserted between the bell-shaped body 5 and the electric motor supporting casing 19.

With the "single-arm" structure just described, in the variator according to FIGS. 12 to 16 the bulk projects from a single side of the differential, which is why the differential has the output zone shifted relative to the input zone towards the bulk of the variator, so as to be able to use two half-axes having more similar lengths. Advantageously, said configuration allows the variator to be inserted under the bonnet, leaving the differential in its optimum position at the centre line of the vehicle.

Moreover, said configuration allows the length of a projection 4a for supporting the auxiliary guide 11 to be kept limited, giving said projection greater stiffness.

This invention achieves the preset aim, overcoming the disadvantages of the prior art.

The combination of the axial movement of the wheel relative to the bell-shaped body, accompanied by a simultaneous rotation between the frames about the hinge axis means that the wheel always remains positioned in contact with the rolling surface as the gear ratio changes.

The special configuration of the variator, with the hinge axis passing through the ideal vertex point of the frustoconical rolling surface brings the significant advantage of maintaining a correct coupling between the tyre of the wheel and the rolling surface, avoiding the micro-slippages which would otherwise arise and would cause power dissipation.

It is also important to consider the obvious advantage in terms of performance brought by the adjusting means which, not doing any work thanks to the auxiliary guides, increase or reduce the contact force between the wheel and the bell-shaped body without power dissipation.

In conditions in which a high level of torque is transmitted, said contact force (and pressure) may be increased in order to reduce possible micro-slippages and therefore to improve adhesion between the wheel and the bell-shaped body. In contrast, in conditions in which low levels of torque are transmitted, said contact force may be reduced so as to reduce the hysteresis of the tyre and, therefore, the resistance torque and the dissipated power.

Moreover, the use of a tyre designed for high pressures (greater than 1.2 MPa) has the effect of further reducing the energy dissipated due to tyre hysteresis cycles, with a further increase in variator overall performance.

Finally, the structure of the variator according to the invention allows it to be positioned according to various orientations, still retaining the positive effects achieved. Thanks to the presence of the adjusting means, the variator can operate with the hinge axis set at an angle or even vertical, therefore without using the component of the weight force of the second frame to increase wheel adhesion on the bell-shaped body. The result is a high degree of flexibility for variator use. It can be installed in diverse operating situations without substantial modifications.

The invention claimed is:

1. A speed variator, comprising:
    a first element (5) having an inside surface and an outside surface, being conical or frustoconical, axially symmetric relative to a first axis (Y) and that rotates on itself about the first axis (Y);
    a rolling surface (6) located on the inside surface of the first element (5);
    a second element (7) that rotates on itself about a second axis (W) and that engages the rolling surface (6), for allowing the transmission of a driving torque between the first and second elements (5, 7);
    an actuator (9) for moving the first and second elements (5, 7) towards and/or away from each other in such a way as to make the second element (7) engage with different portions of the rolling surface (6) for varying a gear ratio between the first and second elements (5, 7);
    the rolling surface (6) and the second axis (W) converging in a point (P).

2. The variator according to claim 1, wherein the second element (7) comprises a wheel (7) equipped with a tyre (8).

3. The variator according to claim 2, wherein the tyre (8) is toroidal, having an outer profile, in cross-section in a plane passing through the second axis (W), which substantially has the shape of a circular arc.

4. The variator according to claim 2, also comprising an inflation duct (20) whose first end is connected to the tyre (8) and whose second end is fitted with an inflation nozzle (21).

5. The variator according to claim 4, characterized by the fact of comprising a first frame (2) on which the first element (5) is stably supported, and a second frame (3) on which the second element (7) is mounted, wherein the frames (2, 3) are coupled to each other in such a way that they can rotate about a hinge axis (X) passing through the point (P), in such a way as to keep the second axis (W) converging in the point (P) during reciprocal rotation of the frames (2,3) about the hinge axis (X); the second frame (3) comprising a supporting shaft (19a) able to rotate about the second axis (W) and integral with the wheel (7), and in which the inside of the supporting shaft (19a) forms the inflation duct (20).

6. The variator according to claim 1, also comprising adjusting means (16) acting between the first and second elements (5, 7) for adjusting a contact force transmitted between the first and second elements (5, 7) in such a way as to press the wheel (7) onto the rolling surface (6) with a force whose extent is variable and controllable in function of the level of transmitted torque.

7. The variator according to claim 6, characterized by the fact of comprising a first frame (2) on which the first element (5) is stably supported, and a second frame (3) on which the second element (7) is mounted, wherein the frames (2, 3) are coupled to each other in such a way that they can rotate about a hinge axis (X) passing through the point (P), in such a way as to keep the second axis (W) converging in the point (P) during reciprocal rotation of the frames (2,3) about the hinge axis (X); the adjusting means (16) comprising an actuator (17) acting between the frames (2,3) for setting a variable and controllable contact force between the first and second elements (5, 7).

8. The variator according to claim 7, wherein the second frame (3) comprises:
    a first portion (3a) hinged to the first frame (2) about the hinge axis (X) and comprising at least one main guide (10) parallel with the second axis (W); and
    a second portion (3b) slidably mounted on the main guide (10) for sliding along a third axis (Z) parallel with the second axis (W), the second element (7) being applied to the second portion (3b) of the second frame (3) for rotating about the second axis (W);
    the first frame (2) comprising at least one fixed auxiliary guide (11) and at least one shoe (12) slidably engaged with the auxiliary guide (11) for sliding on the auxiliary guides (11), in which the auxiliary guide (11) extends along a straight line parallel with a line enveloping ideal contact points between the first and second elements (5, 7), and in which the actuator

(17) applies a thrust action between the shoe (12) and the second portion (3b) of the second frame (3).

9. The variator according to claim 8, wherein the adjusting means (16) also comprise a drive lever (17a) which, at its intermediate portion, is hinged to the shoe (12) and whose first end engages against the second portion (3b) of the second frame (3), the second end of the lever engaging with the actuator (17), said actuator (17) also being mounted on the shoe (12).

10. The variator according to claim 9, wherein the auxiliary guide (11) is at least partly inserted in the first element (5), the drive lever (17a) extending in a direction almost parallel with the auxiliary guide (11).

11. The variator according to claim 8, wherein the actuator (17) comprises a first end applied to the second portion (3b) of the second frame (3) and a second end, opposite the first end, which is applied to the shoe (12) for moving along the auxiliary guide (11).

12. The variator according to claim 8, wherein the line enveloping ideal contact points between the first and second elements (5, 7) coincides with a generatrix (G) of the rolling surface (6) identified by the intersection between the rolling surface (6) and a plane passing through the second axis (W) and perpendicular to the hinge axis (X).

13. The variator according to claim 8, wherein the second portion (3b) of the second frame (3) comprises a receiving portion (28) which is at least partly substantially shaped to match the outer profile of the tyre (8), and in which the actuator applies a thrust action on the receiving portion (28).

14. The variator according to claim 13, wherein the first end of the drive lever (17a) is directly engaged in the receiving portion (28).

15. The variator according to claim 8, wherein the shoe (12) is pulled so that it slides on the respective auxiliary guide (11) by the sliding movement of the second portion (3b) of the second frame (3) along the third axis (Z).

16. The variator according to claim 1, wherein the second element (7) comprises a wheel (7) equipped with a high pressure tyre (8).

17. The variator according to claim 1, wherein the second element (7) comprises a wheel (7) equipped with a tyre (8) designed for inflation pressures higher than 1.2 MPa.

* * * * *